UNITED STATES PATENT OFFICE.

JAMES P. BOOKER, OF NEW YORK, N. Y., ASSIGNOR TO THE NULOMOLINE COMPANY, OF NEW YORK, N. Y., A CORPORATION OF NEW YORK.

PROCESS OF MAKING CREAM CENTERS FOR COATED CANDY.

1,309,979.

Specification of Letters Patent. Patented July 15, 1919.

No Drawing. Application filed September 13, 1917, Serial No. 191,138. Renewed May 16, 1919. Serial No. 297,562.

*To all whom it may concern:*

Be it known that I, JAMES P. BOOKER, a citizen of the United States, residing at New York city, in the county of New York and State of New York, have invented certain new and useful Improvements in Processes of Making Cream Centers for Coated Candy, of which the following is a specification.

My invention relates to the manufacture of soft or cream centers for candy.

These centers are made of fondant which consists of a soft body of sugar partially inverted and partially crystallizable.

The process consists broadly of adding yeast or some enzym to the fondant whereby inversion of the sugar takes place after the coating is applied and other beneficial effects are produced.

In the process that we have under consideration the addition of yeast is not to secure such inversion as we might term ordinary. By this I mean inversion that is secured and has been secured in the past years whenever candy had been made by such acids as cream of tartar, citric acid, tartaric acid and others or by the use of corn syrup or glucose.

I do not propose to change the method of making fondant. The amount of inversion regardless of how it is secured is limited by the fact that there must be left in the fondant sufficient crystallizable sugar to bring about recrystallization by a process commonly spoken of as creaming. If an excessive amount of inversion is secured in the syrup from which the fondant is to be made, the resulting fondant would be tough, inclined to be slightly chewey and it would be impossible to produce from it a soft, tender, center suitable for chocolate coating.

By the addition of acids after the fondant is made, it is possible to secure a very limited amount of inversion, but the fondant will not keep as well as when yeast is added. We can only use a limited amount of acid because it will impart an unpleasant taste to the goods and also bring about marked discoloration. By the use of the yeast we can make a center of unusual softness and make it stay soft from 2 to 12 times as long as the ordinary center would keep.

There is another advantage to be derived from the use of the yeast. All extra soft centers have free moisture in them. This free moisture is very likely to cause fermentation and cause centers to burst their chocolate coating, of course spoiling the goods. The yeast takes up this free moisture making it part of the sugar that it inverts and the heavy syrup that it forms is of such a nature that the germs cannot develop in it. The main reason for using yeast is that by its use we are able to secure an inversion after the goods are chocolate coated. Heretofore, practically all of the inversion took place during the process of making the fondant. This is a very radical change in the manufacturing process. In addition to keeping the centers soft the yeast also has a tendency to stop what candy manufacturers term "leaks." Imperfectly chocolate coated centers often have small leaks and where yeast is not used these leaks allow the moisture contained in the center to dry out and the center becomes hard and unfit to eat.

Where yeast is used these leaks are sealed. The syrup as it comes in contact with the air forms a hard coating with the result that the leak is stopped and a coating formed that is as capable of retaining moisture as the chocolate itself. By varying the amount of yeast used it is possible to obtain any desired degree of softness even to making the goods so soft that when the coating is broken the center will flow from it.

The following formula for a batch of hand rolled cream centers and machine rolled centers illustrates the manner in which my invention may be employed in the manufacture of candy of this character.

Take 45 pounds confectioners' A sugar (other grades of cane or beet sugar may be used if preferred), add 10 to 12 quarts of water and cook to 240 degrees F. Add 5 pounds of nulomoline (or any other inverting agents that may be suited to the purpose). Cook from 242° to 246° according to the season of the year. Pour on cold clean marble, cooler or beater such as is usually used for the making of fondant. When quite cold, work into a fondant. Just as batch starts to whiten add 8 oz. albumen previously soaked in a pint of water and beaten very stiff. Then add 4 small cakes of yeast and flavor as desired. Any marshmallow mixture may be substituted for the albumen or it may be left out entirely. In the latter case the cooking temperature would have to be lower than that given above. When the batch is finished it should be taken from the beater and rolled out into small pieces and coated with chocolate within two hours of the time it is made in order to secure the best results. (Have known of cases when the batch was left over night without spoiling it, but this is not good practice).

To put the whole difference between my process and the ordinary process into a few words would state that First: I secure inversion after the chocolates are coated.

Second: Goods made by my process keep perfectly, which they will not do when made by the common method.

Third: The danger of the goods being spoiled by fermentation is materially reduced.

Fourth: The amount of goods lost by poor dipping is materially reduced because of the sealing of the leaks.

Fifth: The manufacturer is able to control the softness of the center.

I desire it to be understood that there is a great variety of candy in which soft centers are used to which my invention applies and I do not wish to limit it to the formula above given.

It may be explained that the nulomoline referred to above is the commercial name for a colorless invert sugar made in accordance with United States Letters Patent No. 1,181,086, issued April 25, 1916.

I claim:

1. The method of making cream centers for candies which includes incorporating yeast with the fondant composing said center.

2. The method of making candy with cream centers which includes incorporating yeast with the fondant to form the center and coating the center.

3. The method of making candy with cream centers which consists of carrying out the following formula: viz: 45 pounds of confectioners' sugar, 10 quarts of water, cook the same to 240 degrees F., add 5 pounds of invert sugar, cook to 242 to 246 degrees F. and then add four small cakes of yeast and coat the center thus produced.

In testimony whereof I affix my signature.

JAMES P. BOOKER.